US012802126B2

(12) United States Patent
Franklin et al.

(10) Patent No.: US 12,802,126 B2
(45) Date of Patent: Nov. 17, 2026

(54) COMMUNICATION WITHIN DATABASE AND DATA STRUCTURE FILE ENVIRONMENTS

(71) Applicant: Truist Bank, Charlotte, NC (US)

(72) Inventors: Jamie Nathaniel Franklin, Charlotte, NC (US); Mary Margaret Mueller, Charlotte, NC (US)

(73) Assignee: TRUIST BANK, Charlotte, NC (US)

( * ) Notice: Subject to any disclaimer, the term of this patent is extended or adjusted under 35 U.S.C. 154(b) by 0 days.

(21) Appl. No.: 18/779,590

(22) Filed: Jul. 22, 2024

(65) Prior Publication Data

US 2026/0024135 A1 Jan. 22, 2026

(51) Int. Cl.

*G06F 15/16* (2006.01)
*G06Q 40/03* (2023.01)
*H04L 51/046* (2022.01)
*H04L 51/21* (2022.01)

(52) U.S. Cl.

CPC ........... *G06Q 40/03* (2023.01); *H04L 51/046* (2013.01); *H04L 51/21* (2022.05)

(58) Field of Classification Search

CPC ........ G06Q 40/03; H04L 51/21; H04L 51/046
USPC .......................... 709/206; 705/35, 39, 40, 44
See application file for complete search history.

(56) References Cited

U.S. PATENT DOCUMENTS 7,711,618 B2 * 5/2010 Petrime .............. G06Q 30/0621 700/133
8,095,464 B2 * 1/2012 Patterson ............. G06Q 20/102 705/40
8,345,662 B2 * 1/2013 Tarkiainen ............ H04W 4/185 370/351
8,893,966 B2 * 11/2014 Wilen .................... G06Q 30/02 235/487
9,269,081 B1 * 2/2016 Panzer ................... G06Q 50/01
9,306,885 B2 * 4/2016 Collins ................... G06F 21/10
9,693,083 B1 * 6/2017 Yang ...................... H04N 21/2223
10,453,060 B2 * 10/2019 Kohli .................. G06Q 20/4014
11,068,977 B2 * 7/2021 Webster ............... G06Q 20/425
11,429,973 B2 * 8/2022 Kohli ............... G06Q 20/40145
11,966,911 B1 * 4/2024 Young ................ G06Q 20/3265
12,010,119 B2 * 6/2024 Stark ........................ H04L 63/10
12,327,236 B2 * 6/2025 Young ...................... G06F 3/048
12,393,947 B2 * 8/2025 Kohli ...................... G06Q 20/34
(Continued)

*Primary Examiner* — Alicia Baturay
(74) *Attorney, Agent, or Firm* — Michael A. Springs, Esq.; Shumaker, Loop & Kendrick, LLP; Patrick B. Horne

(57) ABSTRACT

A system and method for communication within a database and data structure file environment includes: a communication device operated by a user; a processor and a non-transitory storage device operatively coupled for communication with the device; and a message application stored in the storage device having executable code that, when executed, causes the processor to: set a message send date based upon an expiration date associated with a file of the user stored in the storage device; when a current date corresponds to the message send date, compose a text message including information about a card personalization option and send the message to the communication device; monitor for a response to the message from the communication device prior to a response due date; and when the processor receives a response that includes personalization instructions by the response due date, generate a card according to the instructions before the expiration date.

17 Claims, 2 Drawing Sheets

(56) References Cited

U.S. PATENT DOCUMENTS

| | | | | |
|---|---|---|---|---|
| 2009/0013375 | A1* | 1/2009 | MacIntosh | H04L 63/10 726/1 |
| 2011/0288884 | A1* | 11/2011 | Algoo | G06Q 10/40 705/2 |
| 2014/0108425 | A1* | 4/2014 | Kamdar | G06F 16/958 707/748 |
| 2015/0339645 | A1* | 11/2015 | Isaacson | G06Q 30/0215 705/39 |
| 2017/0255926 | A1* | 9/2017 | Glass | G06Q 20/348 |
| 2017/0278095 | A1* | 9/2017 | Heeter | G06Q 20/405 |
| 2019/0197525 | A1* | 6/2019 | Biehlmann | H04L 67/306 |
| 2022/0027834 | A1* | 1/2022 | Zheng | G06Q 10/1097 |
| 2025/0014018 | A1* | 1/2025 | Oni | G05B 19/4099 |
| 2025/0131423 | A1* | 4/2025 | Shetty | H04L 9/0643 |

* cited by examiner

COMMUNICATION WITHIN DATABASE AND DATA STRUCTURE FILE ENVIRONMENTS

FIELD

This invention relates generally to the field of databases, and more particularly embodiments of the invention relate to methods and systems for communication within a database and data structure file environments to alert a payment card holder to personalization options before a card expiration date.

BACKGROUND

Short Message Service, commonly abbreviated as SMS, is a text messaging service component of most telephone internet and mobile device systems. It is a text only format that does not include graphics such as images and videos. Multimedia Messaging Service, commonly abbreviated MMS, can be used to send images, videos, sound clips, and other files that include larger amounts of data than an SMS message can accommodate. MMS messages are sent via a cellular network.

Text messages are often used by payment card issuers to communicate various alerts to card holders. Such alerts can include low balance notifications, unusual purchase amounts and suspicious vendors.

BRIEF SUMMARY

Many payment card issuers now offer personalization options. However, a current card holder may not be aware of the personalization options, or may not request personalization in time before a new card is issued because the current card is expiring. The systems and methods of the invention described herein solve the above-identified problems.

In an embodiment of the invention, a system for communication within a database and data structure file environments includes: a communication device operated by a user; a processor and a non-transitory storage device operatively coupled for communication with the communication device; and a message application stored in the storage device.

The application includes executable code that, when executed, causes the processor to: set a message send date based upon an expiration date associated with a file of the user, the file being stored in the storage device; when a current date corresponds to the message send date, compose a text message including information about a card personalization option and send the text message to the communication device; monitor for a response to the text message from the communication device prior to a response due date; and when the processor receives a response that includes personalization instructions by the response due date, generate a card according to the personalization instructions before the expiration date.

The message send date is set at a predetermined time period prior to the expiration date. The processor stores the message send date in the storage device with other message send dates and compares the current date with the stored message send dates to identify corresponding ones of the stored message send dates.

The processor calculates the message send date and compares the calculated message send date with the current date to determine whether the current date corresponds.

The processor generates a card based upon a card associated with the expiration date when no response has been received from the communication device prior to the response due date.

The processor generates a card based upon a card associated with the expiration date when the processor receives a response from the communication device prior to the response due date and the response does not include personalization instructions.

The processor resends the text message to the communication device when no response has been received by a reminder send date associated with the file.

The processor calculates the reminder send date based upon the response due date.

In another embodiment of the invention, a method of communication within a database and data structure file environments comprises steps of: providing a processor and a non-transitory storage device operatively coupled for communication with a communication device of a user; storing a message application in the storage device, the application including executable code that is executed by the processor wherein the following steps are performed; setting a message send date based upon an expiration date associated with a file of the user, the file being stored in the storage device; when a current date corresponds to the message send date, composing a text message including information about a card personalization option and sending the text message to the communication device; monitoring for a response to the text message from the communication device prior to a response due date; and when the processor receives a response that includes personalization instructions by the response due date, generating a card according to the personalization instructions before the expiration date.

The method includes setting the message send date at a predetermined time period prior to the expiration date.

The method includes storing the message send date in the storage device with other message send dates and comparing the current date with the stored message send dates to identify corresponding ones of the stored message send dates.

The method includes calculating the message send date and comparing the calculated message send date with the current date to determine whether the current date corresponds.

The method includes generating a card based upon a card associated with the expiration date when no response has been received from the communication device prior to the response due date.

The method includes generating a card based upon a card associated with the expiration date when the processor receives a response from the communication device prior to the response due date and the response does not include personalization instructions.

The method includes resending the text message to the communication device when no response has been received by a reminder send date associated with the file.

The method includes calculating the reminder send date based upon the response due date.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
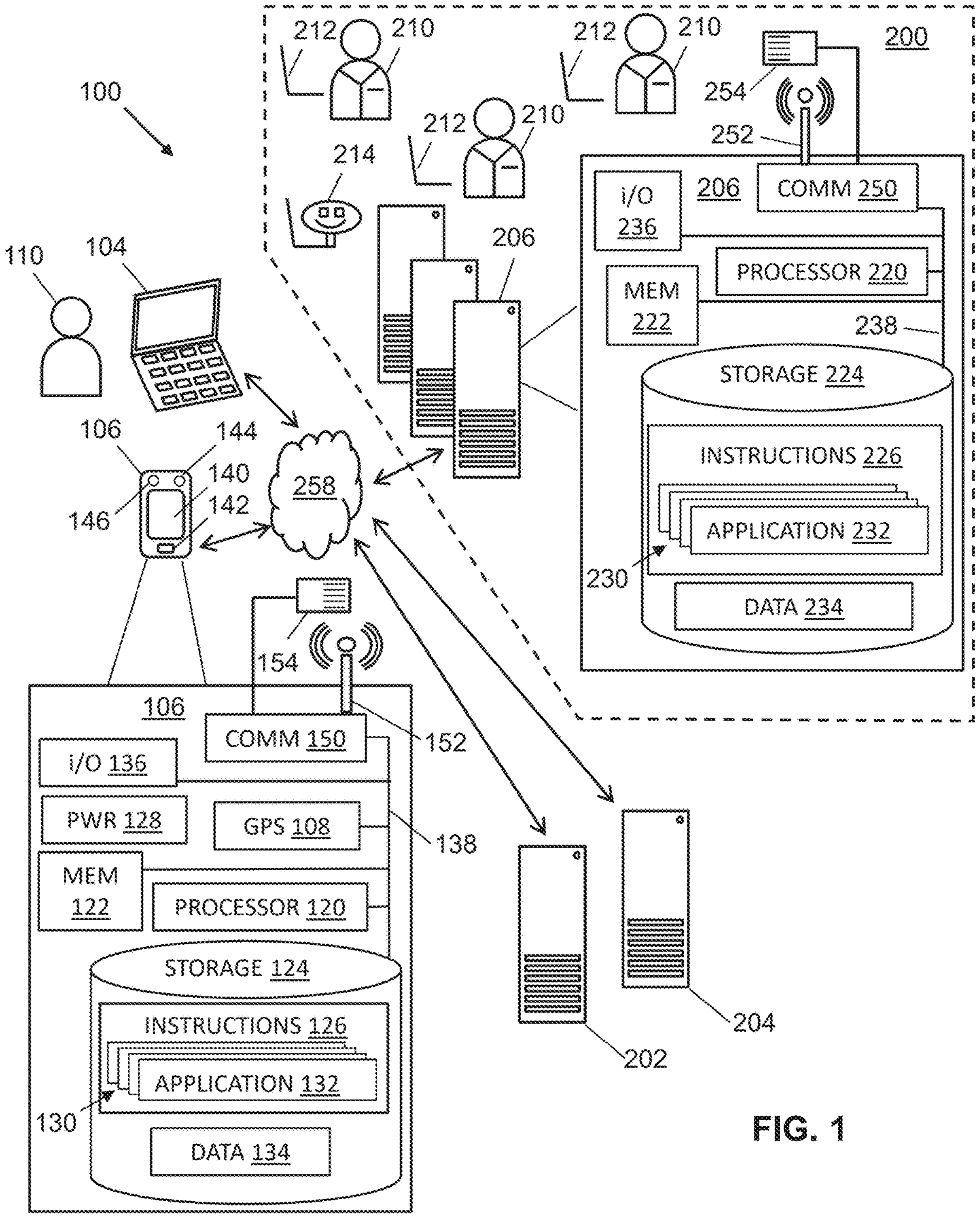

Having thus described embodiments of the invention in general terms, reference will now be made to the accompanying drawings, wherein:

FIG. 1 illustrates an enterprise system, and environment thereof, according to at least one embodiment.

Figure 2:
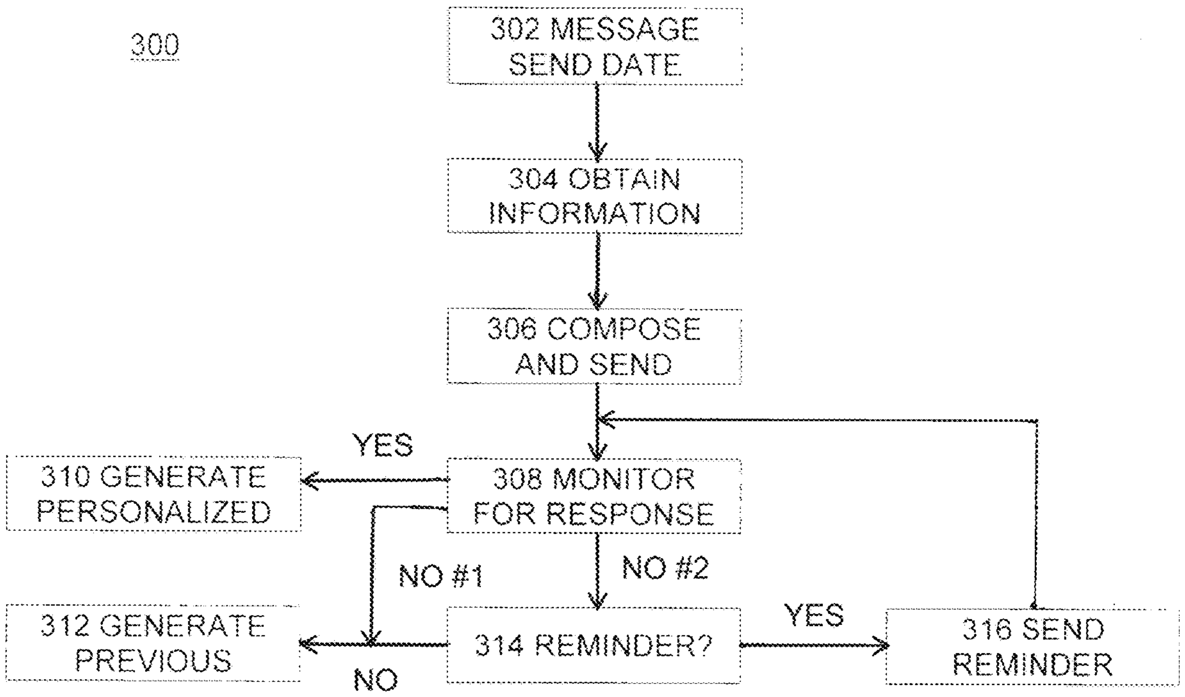

FIG. 2 is a flow diagram representing a method, according to at least one embodiment of the invention, of managing communication in a database of files.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms “coupled,” “fixed,” “attached to,” “communicatively coupled to,” “operatively coupled to,” and the like refer to both (i) direct connecting, coupling, fixing, attaching, communicatively coupling; and (ii) indirect connecting coupling, fixing, attaching, communicatively coupling via one or more intermediate components or features, unless otherwise specified herein. “Communicatively coupled to” and “operatively coupled to” can refer to physically and/or electrically related components.

Embodiments of the present invention described herein, with reference to flowchart illustrations and/or block diagrams of methods or apparatuses (the term “apparatus” includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P transaction system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system user application from a mobile banking system, for example enterprise system 200, or from a distinct application server. In other embodiments, the user 110 interacts with a mobile banking system via a web browser application in addition to, or instead of, the mobile P2P transaction system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include an interface. The network interface may include software, such as encryption software, and hardware, such as a modem, for communicating information to and/or from one or more devices on a network. For example, the mobile device 106 may be configured so that it can be used as a user device by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, account cards, automatic-teller machines, loans, mortgages, personal accounts, business accounts, account management, and credit reporting, requests and scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent transaction clearinghouse or transaction rail systems for processing transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

Payment cards, such as credit and debit cards, can be issued through financial enterprises such as retail and commercial banks. To attract new clients and to retain existing clients, the financial enterprises offer various “perks” and different levels of rewards tied to purchases. For example, rewards might be cash back, miles, or points on eligible purchases depending on the card type and option chosen. Bonus rewards can be earned on categories such as gas, groceries, utilities, dining, airfare, hotels, and car rentals, up to a certain limit per month or year. Loyalty Travel Bonus rewards can be based on a deposit relationship when redeeming rewards for travel through the rewards program.

The financial enterprises also attract and retain clients by offering personalized payment cards. For example, clients can choose from a library of different existing designs. Another option is allowing the client to upload a photo, a logo, or custom design created by the client. Typically, the personalization process is limited to the initial application for a payment card and a period before a card expiration date and a new card is issued. Although financial enterprises notify clients, usually by mail, before a new card is issued, the client might not be aware of the personalization option in time to personalize the new card.

The invention described below involves a system and a method for alerting a payment card client to the card personalization option prior to a deadline for requesting personalization of a payment card to be issued. Most clients provide their payment card issuers with a telephone number for receiving various types of text message alerts in SMS format. The system and method according to the invention uses the telephone number to send an SMS text message alerting the client to the card personalization process deadline.

The system and the method according to the invention are described in the context of a bank issued payment card. However, the described methods and systems also apply to any enterprise that issues debit and credit cards. Payment, debit and credit cards are referred to as "cards" hereafter. The user or bank client 110, shown in FIG. 1, who is the holder of an active card has provided a telephone number for the mobile communication device 106, which number is stored in a file in the storage device 224 as part of the other data 234. The client 110 also has agreed to receive alert text messages at the mobile communication device 106.

FIG. 2 is a flow diagram representing a method 300, according to at least one embodiment of the invention, of alerting the user/client 110 that the card personalization option is available for a limited time before his current card expires and a new card is issued. A message application, being one of the applications 232 stored in the storage device 224, controls the generation of the alert text messages. The message send date for sending the alert message is calculated based upon the expiration date of the card and the time required to generate and deliver a personalized card that determines a response due date.

The method 300 begins at a step 302 by searching for message send dates. The message send date can be calculated and stored in a file associated with the user and/or stored in a file containing the message send dates for cards. As an alternative, the message send date can be calculated in real time from the expiration date. When the message send date for the user/client corresponds with the current date, the method performs a step 304 of obtaining information from the user/client file to be used to compose and send the text message to the user/client. Such information can include the telephone number for texting, the last four digits of the card account number and the card expiration date.

In a step 306, the SMS text message is composed to alert the user/client to the pending card expiration and the response due date by which to respond with card personalization instructions to obtain a personalized card. Then the SMS message is sent to the telephone number of the card holder (user/client). In a step 308, the method monitors for a response communicated from the user's communication device 106. Receiving a response with personalization instructions by the response due date causes the method to branch at YES to a step 310 wherein a personalized card is generated in a conventional manner according to the instructions from the user/client.

As an option, the user/client can communicate a response indicating that no personalization or change is desired. Then the method branches from the step 308 at NO #1 to a step 312 where the new card is generated based upon the expiring card.

A reminder send date that is between the message send date and the response due date can be set and stored in the user/client file or calculated in real time. If no response has been received in the step 308, the method branches at NO #2 to a step 314 where it is determined whether to send a reminder message. If the reminder send date has passed, the method branches at NO to the card generating step 312 to generate a new card based upon the card that is expiring.

If the reminder send date has not passed and a reminder is to be sent, the method branches from the step 314 at YES to a step 316 to send a reminder SMS text message to the telephone number. Then the method returns to the step 308 to monitor for a response. The method 300 is used for each card that is eligible for personalization. The method 300 is triggered by the message send dates that are based upon the card expiration dates.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A system for communication within a database and data structure file environment, the system comprising:
- a communication device operated by a user;
- a processor and a non-transitory storage device operatively coupled for communication with the communication device; and
- a message application stored in the storage device, the application including executable code that, when executed, causes the processor to:
  - set a message send date based upon an expiration date associated with a file of the user, the file being stored in the storage device;
  - when a current date corresponds to the message send date, compose a text message including information about a card personalization option and send the text message to the communication device, the card personalization option enabling the user to provide personalization instructions related to a design to be included on a new card to be generated;
  - monitor for a response to the text message from the communication device prior to a response due date; and
  - when the processor receives a response that includes the personalization instructions by the response due date, generate the new card having the design included thereon according to the personalization instructions before the expiration date and delivering the new card to the user.

2. The system according to claim 1 wherein the message send date is set at a predetermined time period prior to the expiration date.

3. The system according to claim 1 wherein the processor stores the message send date in the storage device with other message send dates and compares the current date with the stored message send dates to identify corresponding ones of the stored message send dates.

4. The system according to claim 1 wherein the processor calculates the message send date and compares the calculated message send date with the current date to determine whether the current date corresponds.

5. The system according to claim 1 wherein the processor generates the new card based upon a card associated with the expiration date when no response has been received from the communication device prior to the response due date.

6. The system according to claim 1 wherein the processor generates the new card based upon a card associated with the expiration date when the processor receives a response from the communication device prior to the response due date and the response does not include personalization instructions.

7. The system according to claim 1 wherein the processor resends the text message to the communication device when no response has been received by a reminder send date associated with the file.

8. The system according to claim 1 wherein the processor calculates a reminder send date based upon the response due date.

9. A method of communication within a database and data structure file environment, the method comprising steps of:

providing a processor and a non-transitory storage device operatively coupled for communication with a communication device of a user;

storing a message application in the storage device, the application including executable code that is executed by the processor wherein the following steps are performed;

setting a message send date based upon an expiration date associated with a file of the user, the file being stored in the storage device;

when a current date corresponds to the message send date, composing a text message including information about a card personalization option and sending the text message to the communication device, the card personalization option enabling the user to provide personalization instructions related to a design to be included on a new card to be generated;

monitoring for a response to the text message from the communication device prior to a response due date; and when the processor receives a response that includes the personalization instructions by the response due date, generating the new card having the design included thereon according to the personalization instructions before the expiration date and delivering the new card to the user.

10. The method according to claim 9 including setting the message send date at a predetermined time period prior to the expiration date.

11. The method according to claim 9 including storing the message send date in the storage device with other message send dates and comparing the current date with the stored message send dates to identify corresponding ones of the stored message send dates.

12. The method according to claim 9 including calculating the message send date and comparing the calculated message send date with the current date to determine whether the current date corresponds.

13. The method according to claim 9 including generating the new card based upon a card associated with the expiration date when no response has been received from the communication device prior to the response due date.

14. The method according to claim 9 including generating the new card based upon a card associated with the expiration date when the processor receives a response from the communication device prior to the response due date and the response does not include personalization instructions.

15. The method according to claim 9 including resending the text message to the communication device when no response has been received by a reminder send date associated with the file.

16. The method according to claim 9 including calculating a reminder send date based upon the response due date.

17. A non-transitory computer-readable medium storing instructions that, when executed by one or more processors of a computing system, cause the computing system to perform operations comprising:

set a message send date based upon an expiration date associated with a file of a user, the file being stored in a non-transitory storage device operatively coupled for communication with a communication device of a user;

when a current date corresponds to the message send date, composing a text message including information about a card personalization option and sending the text message to the communication device, the card personalization option enabling the user to provide personalization instructions related to a design to be included on a new card to be generated;

monitoring for a response to the text message from the communication device prior to a response due date; and when the processor receives a response that includes the personalization instructions by the response due date, generating the new card having the design included thereon according to the personalization instructions before the expiration date and delivering the new card to the user.

* * * * *